United States Patent
Martin

[11] Patent Number: 6,146,538
[45] Date of Patent: Nov. 14, 2000

[54] METHOD OF INHIBITING SCALE FORMATION

[75] Inventor: Roy Martin, Downers Grove, Ill.

[73] Assignee: United States Filter Corporation, Palm Desert, Calif.

[21] Appl. No.: 09/378,232

[22] Filed: Aug. 19, 1999

Related U.S. Application Data

[63] Continuation-in-part of application No. 09/028,197, Feb. 23, 1998, abandoned.

[51] Int. Cl.[7] .................................................. C02F 1/76
[52] U.S. Cl. ........................ 210/698; 210/739; 210/756; 252/181
[58] Field of Search .................. 210/696–701, 210/739, 743, 754, 756, 758; 252/175, 180, 181

[56] References Cited

U.S. PATENT DOCUMENTS

| | | | |
|---|---|---|---|
| 4,087,360 | 5/1978 | Faust et al. ............................ | 210/169 |
| 4,416,785 | 11/1983 | Menke et al. ........................... | 210/699 |
| 4,654,159 | 3/1987 | Bush et al. ................................. | 252/95 |
| 5,062,962 | 11/1991 | Brown et al. ........................... | 210/698 |
| 5,171,451 | 12/1992 | Khambatta et al. .................... | 210/701 |
| 5,518,629 | 5/1996 | Perez et al. .............................. | 210/698 |

*Primary Examiner*—Peter A. Hruskoci
*Attorney, Agent, or Firm*—McHale & Slavin

[57] ABSTRACT

The present invention relates to the addition of an alkali salt form or a precipitated alkali salt form of a PESA, polymaleic acid or mixture thereof, which is added, directly and/or indirectly, to an oxidizer, e.g. calcium hypochlorite, to inhibit formation of scale, particularly calcium carbonate scale, when the oxidizer contacts water containing carbonate alkalinity. This provides effective inhibition of calcium carbonate in and on oxidizer feed equipment. Process efficiency is greatly enhanced by selecting, as the limiting factor, the concentration of alkalinity present that can be converted to carbonate ions (the carbonate alkalinity). Optimization of the feedrate of polymer based on the carbonate alkalinity results in effective scale inhibition at an LSI value greater than 3.5.

9 Claims, 2 Drawing Sheets

METHOD OF INHIBITING SCALE FORMATION

REFERENCE TO RELATED APPLICATIONS

This application is a continuation-in-part of Ser. No. 09/028,197, filed Feb. 23, 1998, now abandoned the contents of which are herein incorporated by reference.

FIELD OF THE INVENTION

The present invention relates to a method for inhibiting scale formation in oxidizer feed equipment. The invention particularly relates to the addition of a polymer scale inhibitor with water as a function of the water's carbonate alkalinity; and most particularly relates to the treatment of alkaline oxidizers with a salt form, or a precipitated salt form of the polymer for enhanced scale inhibition.

BACKGROUND OF THE INVENTION

Chemical treatment of water to obviate the dangers of microbiological contamination often requires the addition of oxidizing agents, for example, alkaline oxidizers such as calcium hypochlorite, liquid bleach (sodium hypochlorite) lithium hypochlorite or the like. While these compounds are highly effective water sanitizers, a problem concomitant with their use is the precipitation of carbonate salts, most notably calcium carbonate, on or in the oxidizer feed or injection equipment. Furthermore, chemicals which are commonly used to control the fouling effects of calcium carbonate scale are susceptible to oxidation which contributes additional undesirable byproducts to the water, e.g. phosphates.

Carbon dioxide is generally present in varying amounts in most natural waters, and is found to exist as several distinct species. As illustrated in the following graph, the percentages at which differing species exist varies as a function of solution pH. Water having a pH of less than 7.5 avoids carbonate alkalinity. At a pH of less than about 8.3, the carbon dioxide based alkalinity is in the form of bicarbonate ($HCO_3^-$) ions. Many common oxidizers raise the pH of water being treated. For example, in the case of calcium hypochlorite, it is common for water treated with this oxidizer to achieve a pH of greater than 10. As the pH rises above about 8.3, the alkalinity begins converting to the carbonate ($CO_3^=$) form. Compounding the problem is the release of high concentrations of calcium which assure calcium carbonate scale formation. In the case of liquid bleach, a pH of greater than 12 occurs which induces calcium carbonate formation at injection points, thus reducing chemical delivery.

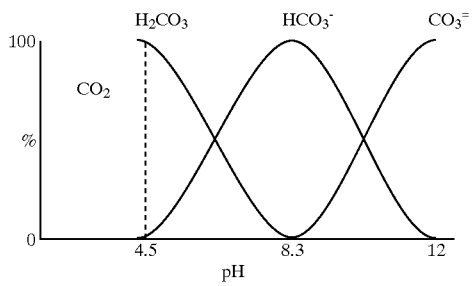

In the case of alkaline oxidizers the pH is very high, which is the result of a high presence of hydroxide based alkalinity ($OH^-$). Upon contacting water, for example in a water treatment process plant, the alkaline oxidizer causes the localized pH at the point of contact to rise. Bicarbonate alkalinity in the water then reacts with the hydroxide alkalinity, forming a carbonate ion and water in accordance with the following relationship:

$$HCO_3^- + OH^- \rightarrow CO_3^= + H_2O$$

At this point the carbonate becomes available to combine with calcium forming a precipitate. The active formation of calcium carbonate in the water induces the formation of a crystal lattice structure at various points within the system, restricting waterflow and promoting or accelerating the failure of critical parts of the system.

Various classes of polymer compounds are known to have utility in impeding the progress of crystal lattice formation. Among these are polyepoxysuccinic acid (PESA) compounds and polymers of maleic and acrylic acids, the use of which is disclosed in the following prior art patents:

U.S. Pat. No. 4,654,159 teaches a method of forming a PESA compound which is useful as a scale control agent.

U.S. Pat. No. 5,062,962 describes a method of controlling scale formation by the addition of substoichiometric levels of PESA to circulating industrial cooling water systems where water from natural sources is employed as the cooling medium for heat exchangers.

U.S. Pat. No. 5,518,629 discloses a method of treating water to inhibit scale formation by utilizing a substoichiometric amount of a scale inhibitor in combination with a substituted alkylpolycarboxylate.

U.S. Pat. No. 4,087,360 teaches a method of scale inhibition utilizing a combination of a calcium hypochlorite and a proportion of a polyacrylic acid compound.

The problem with the prior art processes is that they have consistently predicated their choice of treatment ratios by utilizing the water's calcium level as a controlling parameter. By so doing, the prior art processes have been limited to the feeding of only substoichiometric levels of compounds, e.g. PESA or polymaleate compounds, in open recirculating systems; whereby scale inhibition is taught up to an LSI of only about 3.5.

If a process could be devised which optimized the active polymer utilization, then effective scale inhibition could be achieved at LSI values substantially in excess of those taught by the prior art.

SUMMARY OF THE INVENTION

In the present invention, a salt of a polymer scale inhibitor, e.g. PESA or polymaleic acid is added, directly and/or indirectly, to an oxidizer to inhibit formation of scale, particularly calcium carbonate scale, when the oxidizer contacts water. This provides effective inhibition of calcium carbonate in and on oxidizer feed equipment.

The present inventor has discovered that process efficiency may be greatly enhanced by selecting, as the limiting factor, the concentration of alkalinity present that can be converted to carbonate ions (the carbonate alkalinity). Optimization of the feedrate of polymer based on the carbonate alkalinity results in effective scale inhibition at an LSI value greatly exceeding that contemplated by the prior art. At high LSI conditions, e.g. LSI values greater than about 3.5, the range of application of the polymers is dramatically extended by delivering the active polymer in an amount which is proportional to the carbonate alkalinity.

The concentration of carbonate ions can be calculated by knowing the oxidizer's hydroxide ($OH^-$) concentration and feedrate, or based upon the pH of the final solution, along with the water's alkalinity and flowrate. Active polymer to carbonate ratios will range from about 0.1:1 to about 2:1 (in units of weight or PPM). Alternatively, the polymer feedrates may also be based upon a worst case scenario by targeting polymer feed on the water's total alkalinity—calculated as the maximum carbonate alkalinity achievable based upon $CO_2$ alkalinity. Once the carbonate ion concentration has been determined, the appropriate concentration of polymer can be calculated using the above-mentioned ratios.

Accordingly, it is an objective of the instant invention to teach the addition of a scale-inhibiting effective amount of a salt of a polymer selected from PESA, polymaleic acid or mixtures thereof, to an oxidizer, in liquid, solid or slurry form, prior to instillation of said oxidizer to oxidizer feed equipment.

It is a further objective of the instant invention to teach optimization of the feedrate of polymer salt based on the carbonate alkalinity whereby effective scale inhibition at an LSI value greater than 3.5 is achieved.

It is yet another objective of the instant invention to teach instillation of the active polymer salt based upon polymer salt to carbonate ratios within the range of from about 0.1:1 to about 2:1 (in units of weight or PPM)

It is a still further objective of the invention to teach reduction of overall polymer requirements by forming a precipitated salt form of the polymer, whereby the functionality of the polymer is in essence deactivated such that treatment of an oxidizer with the precipitated salt form of the polymer product causes the polymer to establish equilibrium upon reconstitution with water, by dissociating from the calcium or other divalent metal salts, leaving the active polymer available to inhibit scale formation.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

With reference to FIGS. 1–5, block diagrams outlining various methods of formation of the alkali salt form of PESA and/or polymaleic acid polymer and methods of combination/application to water treatment systems are shown. The polymer may be applied in a liquid salt form or a precipitated slurry or solid form dependent upon the type of alkaline oxidizer or application in question. While not being limited thereto, the invention contemplates the use of the calcium, magnesium, sodium, potassium and lithium salts of PESA and polymaleic acid, either singly, or in any combination thereof.

Figure 1:
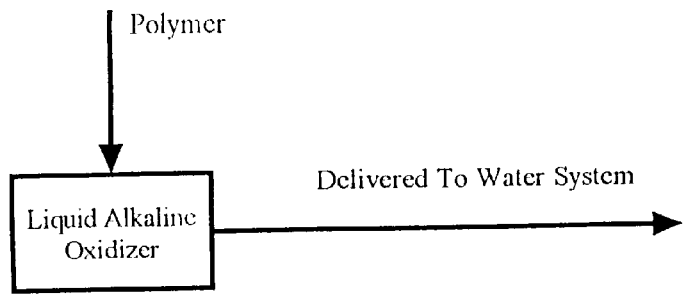
FIG. 1 is a block diagram showing addition of the alkali salt form of PESA and/or polymaleic acid to a liquid alkaline oxidizer.

With reference to FIG. 1, polymer can be blended in with liquid hypochlorite solutions such as sodium hypochlorite (NaHOCl), lithium hypochlorite or the like, or addition may be made to a make-down tank, where solid calcium hypochlorite ($Ca(HOCl)_2$) is diluted with water to form a solution.

Figure 2:
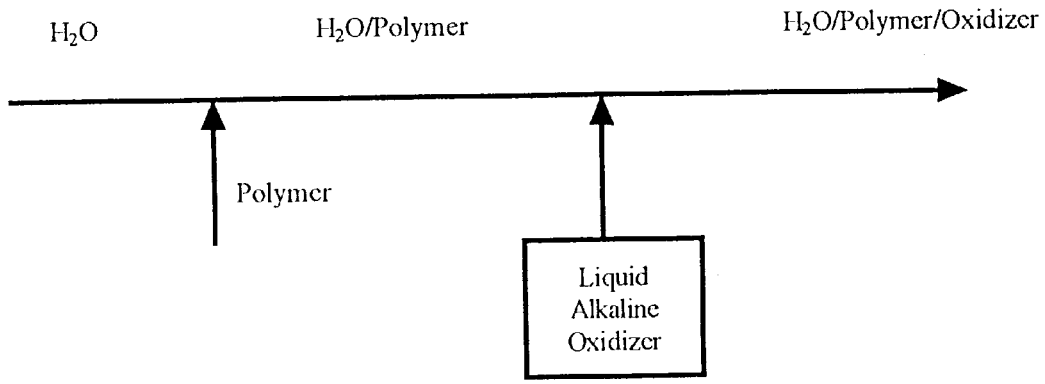
FIG. 2 is a block diagram showing the addition of the PESA and/or polymaleic acid salt in an aqueous stream prior to treatment with said alkaline oxidizer.

Referring to FIG. 2, polymer may also be added to the water prior to the addition of the liquid alkaline oxidizer.

Figure 3:
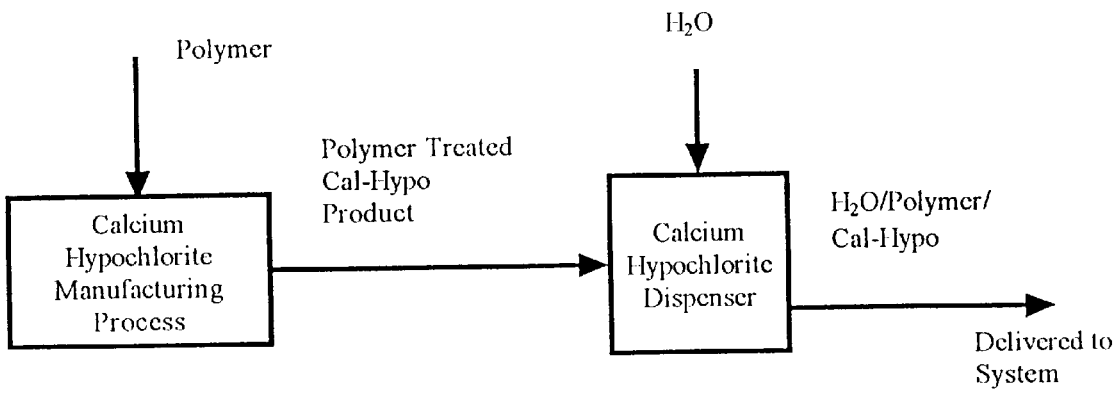
FIG. 3 is a block diagram showing the addition of PESA and/or polymaleic acid salt to calcium hypochlorite during the manufacturing process to form a treated calcium hypochlorite.

As illustrated in FIG. 3, when solid alkaline oxidizers are desired for the water treatment application, the polymer can be added to the product, e.g. cal-hypo, at any point during the manufacturing process.

Figure 4:
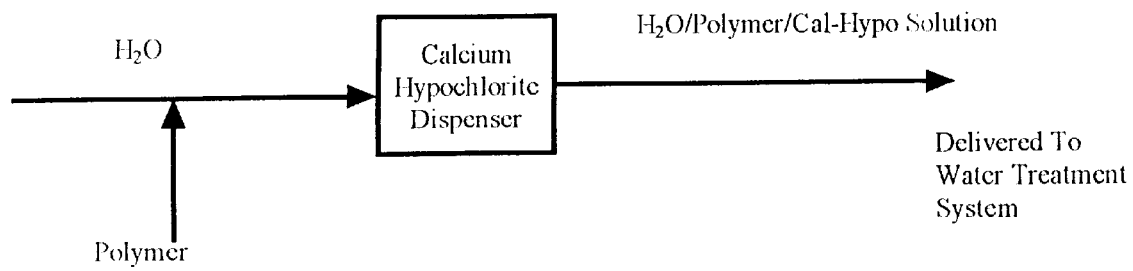
FIG. 4 is a block diagram showing the addition of an aqueous solution of PESA and/or polymaleate salt to solid calcium hypochlorite.

As further illustrated in FIG. 4, the polymer may also be added to the water prior to contact with the untreated solid oxidizer.

Figure 5:
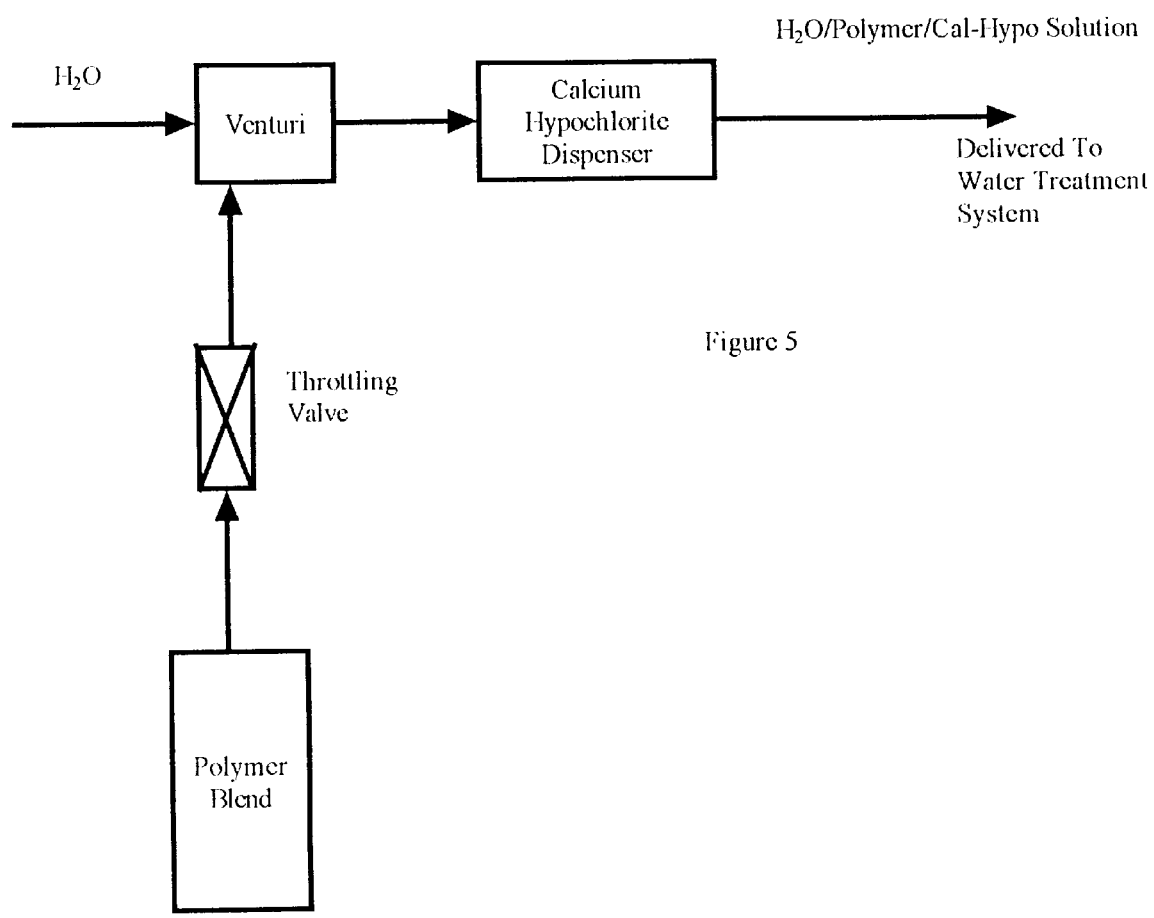
FIG. 5 is a block diagram showing dosing of a polymer blend to a calcium hypochlorite feeder to produce a working solution.

FIG. 5 shows a chemical feed system consisting of: tubing, throttling valve, and venturi, attached to a water supply to drive the venturi. Any number of other suitable feed devices may be used. The water/polymer solution is added to the cal-hypo feeder and the resultant working solution of water/polymer/cal-hypo is dosed to the water treatment application.

Calcium hypochlorite (cal-hypo) contains calcium carbonate generally ranging in concentrations from 1.5–2.5%. Addition of the active polymer into the slurry of calcium hypochlorite during manufacturing will induce adsorption of the polymer onto the calcium carbonate in the slurry, thus consuming the active polymer. When the treated cal-hypo product is reconstituted with water that contains alkalinity, the polymer is not available to inhibit scaling. Thus, to achieve the desired scale inhibition, higher concentrations of polymer must be used.

In accordance with the instant invention, it has been discovered that by forming a precipitated salt form of the polymer, the functionality of the polymer is in essence deactivated. When cal-hypo, treated with the precipitated salt form of the polymer product is reconstituted with water, the polymer establishes equilibrium by dissociating from the calcium, and the active polymer is available to inhibit scale formation, thereby reducing the overall polymer requirements.

In the case of calcium hypochlorite, a calcium salt form of polymer was used. Other useful salt forms are sodium, potassium, lithium and magnesium. The polymer was deactivated by first precipitating the polymer in a salt form. This can be done using any number of alkali metals. In this example, a calcium salt was formed with addition of lime (CaO), in the form of a slurry. The clear amber polymer forms a viscous slurry with addition of the lime slurry. In this illustration, lime plays two roles; pH adjustment, and formation of an insoluble form of polymer salt. The polymer slurry may be added during the manufacturing process to produce a solid cal-hypo/polymer product, or dried for later use. Many alkali salts such as sodium, potassium, and lithium can provide effective results. Divalent salts, such as calcium and magnesium are considered most advantageous for this application, however the invention should not be considered to be limited thereto.

EXAMPLES

The following example utilizes a calcium polymaleate salt mixed with ground calcium hypochlorite.

A calcium polymaleate precipitate was formed by adding 20 grams of lime (CaO) to 80 ml of water. The slurry was mixed, then slowly decanted into 143 grams of 50% active polymaleic acid having a molecular weight of 500–1000. After mixing, the clear amber polymer solution formed a viscous precipitate. After settling 24-hours, excess water was decanted, and the remaining slurry was dried. The dried crystals of salt were crushed. 6.41 grams of crystals (approx 5 grams of active polymer) were combined with 577 grams of ground calcium hypochlorite sold under the brand name HTH. The blend was thoroughly mixed to ensure a homogenous mix.

Six gallons of water was prepared containing 110 PPM calcium and 440 PPM of alkalinity.

A test rig was prepared consisting of a plastic mesh filter incorporated in a funnel as a substrate for the dry product. The polymer/cal-hypo blend was added to the funnel supported by the plastic mesh media and a small vacuum was applied to insure uninterrupted flow while taking care not to draw air through the sample cell. Water was metered at 75 ml/min across the top of the blend. Sample cells were formed from ½" diameter PVC nipples engaged onto the end of the funnel. Each sample cell was weighed, the roughened with sand paper to enhance nucleation, with 0.02 grams of PVC being removed from each nipple to ensure each sample cell received the same approximate level of roughness.

| Sample | Grams of scale |
| --- | --- |
| Blank | 0.11 gram |
| Cal-hypo/polymer salt | 0.00 gram |

Field Results
Preparation

A polymaleic acid sold under the name ACUMER 4210 is manufactured by Rohm & Haas. ACUMER 4210 is 50% active polymer, possessing a molecular weight of 500–1000. The polymer was diluted with a slow addition of 50% NaOH while undergoing thorough mixing. The 37% active polymer blend was packaged for field trials.

A chemical feed system is assembled consisting of tubing, throttling valve, and venturi, attached to a water supply to drive the venturi, as best seen in FIG. 5). This system is exemplary, and the invention contemplates the use of any number of suitable alternative feed devices.

The feed system was connected upstream of a calcium hypochlorite feed system sold under the trade name PULSAR.

The locations selected were pools with existing cal-hypo feed systems. These locations had experienced feeder failure weekly unless the feed system was acid washed to remove scale and deposits.

Field Study 1

An aquatic swimming facility had an alkalinity consistently at, or above 120 PPM in the water used to dissolve the cal-hypo. This facility had experienced lost chemical feed within days of acid washing. The described chemical feed system was employed with a feed-rate of 0.5 ml polymer blend per 1-gallon of water. During the 4-month trial, acid washing was eliminated. No interruptions of oxidizer feed occurred during the period of treatment.

Field Study 2

In a separate application, a granular cal-hypo product sold under the brand name PULSAR SHOCK (75% cal-hypo) was added to a mixing tank of water, thoroughly mixed, and fed to the pool system by a chemical metering pump. The feed system routinely experienced scaled cal-hypo feed equipment and subsequent loss of chemical feed. The dosage of the polymer blend was 1 ml/gallon for a 4% cal-hypo solution. During the 4 weeks of testing, the oxidizer feed system functioned without interruption.

The following example utilizes a PESA polymer.

Example

Appropriate laboratory protocol was used to test effectivity of the method by applying a measured quantity of water to a measured weight of calcium hypochlorite. The flow rate was held constant (~75 ml/min) throughout the testing. Each test used 10 gallons of water having the following chemistry: calcium 110 ppm, alkalinity from water soluble cations of 420 ppm, and a pH of 7.85. Each test used approximately 968 grams of 65% active calcium hypochlorite, initializing with 509 grams. Measured amounts of calcium hypochlorite were added to maintain consistent levels.

Example 2

Sample cells were made from ½ inch diameter PVC nipples engaged onto an end of a funnel. Each sample cell was weighed, then roughened with sand paper to enhance nucleation, with 0.02 grams of PVC being removed from each nipple to ensure each sample cell received the same approximate level of roughness.

In this test, the PESA was added to the water used to dissolve the calcium hypochlorite. The concentration of PESA was varied after each test to determine optimum feed rates. After each test, the sample cell was rinsed to remove nonadherent formation, dried, and again weighed to determine the amount of deposit. Results of the test were as follows:

| Sample | Increase in sample cell weight |
| --- | --- |
| Blank Run 1 | 0.16 gram |
| 100 ppm PESA | 0.09 gram |
| 200 ppm PESA | 0.00 gram |

Example 3

In this example, a dry salt form of PESA was added to ground calcium hypochlorite. A plastic filter used in vacuum filtration systems was incorporated in the funnel as a substrate for the dry product. A small vacuum was employed to insure uninterrupted flow while being careful not to draw air through the sample cell. The ratio of PESA to calcium hypochlorite was altered to achieve various calculated concentrations. The treated water first flowed through the inside of the sample cell, then up the outside. The results were as follows:

| Sample number | Increase in sample cell weight |
| --- | --- |
| Blank 2 | 0.15 gram |
| 0.4% w/w | 0.07 gram |
| 0.78% w/w | 0.01 gram |

Example 4

The test of Example 2 was repeated using polymaleic acid (designated PM) instead of PESA. Results of the test were as follows:

| Sample number | Increase in sample cell weight |
| --- | --- |
| Blank 3 | 0.17 gram |
| 100 ppm PM | 0.08 gram |
| 200 ppm PM | 0.00 gram |

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method for inhibition of calcium based scale in and on components of an oxidizer feed system in a water treatment process comprising:

providing an alkaline hypochlorite oxidizer;

providing an alkali salt form of polymer selected from the group consisting of calcium polyepoxysuccinic acid (PESA), magnesium PESA, sodium PESA, potassium PESA, lithium PESA, calcium polymaleate, magnesium polymaleate, sodium polymaleate, potassium polymaleate, lithium polymaleate and mixtures thereof;

determining carbonate alkalinity of a source of water to be treated;

forming an oxidizer feed solution including said oxidizer, said polymer and said source of water;

maintaining said oxidizer feed solution at a weight ratio of the alkali salt form of polymer to carbonate based alkalinity within the range of from about 0.1:1 to about 2:1; and dispensing said solution into said water treatment process;

whereby effective scale inhibition is achieved in said oxidizer system at LSI values greater than 3.5.

2. The method in accordance with claim 1, wherein:

the alkali salt form of polymer is in the form of a solid.

3. The method in accordance with claim 1, wherein:

the alkali salt form of polymer is in the form of a slurry.

4. The method in accordance with claim 1, wherein:

the alkali said form of polymer is in the form of a liquid.

5. The method in accordance with claim 1, wherein:

the oxidizer is a liquid hypochlorite solution.

6. The method in accordance with claim 5, wherein:

the oxidizer is a NaHOCl solution.

7. The method in accordance with claim 1, wherein:

the oxidizer is a solid calcium hypochlorite.

8. The method in accordance with claim 1, wherein:

a deactivated alkali salt form of polymer is added to a calcium hypochlorite oxidizer during a manufacturing process;

whereby a solid blended product is produced to form said oxidizer feed solution.

9. The method in accordance with claim 1, wherein:

the alkali salt form of polymer is added to the water prior to addition of the oxidizer.

* * * * *

UNITED STATES PATENT AND TRADEMARK OFFICE
CERTIFICATE OF CORRECTION

PATENT NO.    : 6,146,538
DATED         : November 14, 2000
INVENTOR(S)   : Martin It is certified that error appears in the above-identified patent and that said Letters Patent is hereby corrected as shown below:

<u>Column 4,</u>
Line 11, change "(NaHOCl)" to -- (NaOCl) --.
Line 13, change "(Ca(HOCl)2)" to -- (Ca(Ocl)2) --.

<u>Column 8,</u>
Line 17, change "NaHOCl" to -- NaOCl --.

Signed and Sealed this

Eleventh Day of June, 2002

Attest:

JAMES E. ROGAN
Attesting Officer          Director of the United States Patent and Trademark Office